(12) United States Patent
Scanlan

(10) Patent No.: US 6,299,426 B1
(45) Date of Patent: Oct. 9, 2001

(54) MOLD AND DIE CASTING APPARATUS INCLUDING A COMPACT CORE POSITION SENSOR UNIT HAVING MAGNETIC SWITCHES

(75) Inventor: Mark R. Scanlan, West Bend, WI (US)

(73) Assignee: PFA Incorporated, Germantown, WI (US)

( * ) Notice: Subject to any disclaimer, the term of this patent is extended or adjusted under 35 U.S.C. 154(b) by 0 days.

(21) Appl. No.: 09/344,463

(22) Filed: Jun. 25, 1999

(51) Int. Cl.[7] .......................... B29C 35/76; B29C 45/84; B29C 47/96
(52) U.S. Cl. .......................... 425/138; 425/150; 425/171
(58) Field of Search .................... 425/138, 150, 425/468, 577, DIG. 10, 171; 248/63, 64, 142

(56) References Cited

U.S. PATENT DOCUMENTS

| | | | |
|---|---|---|---|
| 3,676,812 | * 7/1972 | Wrabetz | 335/205 |
| 4,112,576 | * 9/1978 | Gross | 29/602 R |
| 4,296,394 | * 10/1981 | Ragheb | 335/207 |
| 5,409,647 | * 4/1995 | Kiefer et al. | 264/40.4 |
| 5,770,792 | * 6/1998 | Nakada et al. | 73/12.01 |

* cited by examiner

*Primary Examiner*—Nam Nguyen
*Assistant Examiner*—Emmanuel Luk
(74) *Attorney, Agent, or Firm*—Andrus, Sceales, Starke & Sawall

(57) ABSTRACT

A molding apparatus includes a cavity half and a core half mounted in stacked relation between a press plate and a movable platen. A plurality of core members are slidably mounted in the cavity half and each is connected to an actuator attached to the cavity half. The actuators project outwardly. Each actuator includes at least two sensing switch units for monitoring the limits of the core position. Each sensing unit is a compact relay switch unit having a rugged housing of a length not to exceed two inches to positively prevent interference with the associated components of the molding apparatus. The relay switch unit includes a pair of fixed contacts mounted within the housing and a movable contact located therebetween. A magnetic unit including a high strength target magnet connected to the movable contact and a weak bias magnet mounted within the housing to control the initial position of the target magnet and the movable contact. A threaded nose of the housing has an O-ring and is located within a stepped opening in the actuator housing. Threading the nose into firm mounted engagement locates the target magnet in proper relationship to a movable metal member directly related to the location of the core and actuates the relay switch unit to signal the core position to a control.

16 Claims, 3 Drawing Sheets

MOLD AND DIE CASTING APPARATUS INCLUDING A COMPACT CORE POSITION SENSOR UNIT HAVING MAGNETIC SWITCHES

BACKGROUND AND SUMMARY OF THE INVENTION

This invention is directed to a mold and die casting apparatus including a compact core position sensor unit.

In mold and die casting systems, one or more core members of a mold body must be accurately positioned between opened and closed positions. A typical application is disclosed in copending application entitled "Threaded Actuator For Positioning Structure Subject To Intense Load" filed on Dec. 15, 1998 with Ser. No. 09/211,536 and assigned to the assignee of this application. In such application, a movable core is mounted to a core slide within a core cavity and coupled to a threaded actuator secured to the mold base or the like. The threaded actuator includes a hydraulic cylinder unit having a piston and piston rod connected to the core slide. The cylinder unit is specially constructed to establish a high locking force system between the piston rod and the cylinder thereof such that with the core appropriately located, the core is held in place under a very intense force, often greater than the cylinder motor force. In this and like applications, the accuracy of the core positioning is dependent on the accurate detection of the sensing and location of a locking member connected to the piston rod of the hydraulic cylinder unit or other prime mover. In a particularly practical and efficient system presently manufactured and sold, sensing units are connected to the hydraulic cylinder unit to detect the fully extended loaded position as well as the fully retracted position, and thereby the limits of the core slide and core. The sensing unit is attached to, and projects outwardly, from the cylinder unit. Because of various mounting systems for the hydraulic cylinder in relation to the associated equipment of the mold system, the size of the sensors must fall within certain restrictions to avoid interference with the adjoining structures. The present structure provided by the assignee uses a very small Hall effect cell based sensor which has a length of slightly less than one inch and threads into the cylinder block, with the sensing end located in accurate spaced position for detection of the loaded and the retracted positions of the actuator unit. One sensor is secured to the side of a cylinder unit to detect the forward or load position of the actuator. A second sensor is connected to the outer end of the cylinder unit to detect the retracted or release position of the actuator. One present sensor unit which has produced highly successful location detection is a integrated circuit switch using a NPN Hall effect position sensing system. The system requires a power source connection providing an output to a computer system processing the sensed signal which interconnects the output to actuate a suitable relay system. This is a relatively expensive system and employs a somewhat fragile construction and which must be adapted to each particular available voltage system. A computer interface is necessary to provide a universal connection to any type of a control system without the necessity of special conversion systems or circuitry. Although it is found to provide an exceptionally satisfactory system, the unit adds significantly to the total cost and complexity of the apparatus.

A simple sensing relay switch is preferred as it functions as a simple on/off switch and eliminates interface circuitry and expense. However, such alternative available switches providing a simple on/off switching contact have been costly and significantly only been constructed with interfering lengths, generally a minimum of three inches in length. Although the relay type switch should provide a less expensive system, the system has not in fact been less costly because of the switch cost and has not been readily accepted in many applications because of physical interference between the switch and various associated components of the mold and die casting system. Further, the available switch does not include an accurate depth setting method. The relatively large extension of the switch is also prone to damage thereof.

SUMMARY OF THE PRESENT INVENTION

The present invention provides a relatively small compact relay switch structure which can be used with minimal interference with the associated components such as water cooling lines, manifolds, platen, doors, tie bars and other parts of the mold or mold machine components as such and thereby eliminate the complex interface and interference effects, and at lesser costs than the prior art systems.

Generally, in a preferred construction, the present invention includes a relay switch having a reasonable diameter and a length on the order of inches and a maximum length on the order of two inches. The switch includes a relatively short threaded nose for mounting of the switch within the body of the position power unit or actuator with the inner end of the nose spaced slightly from the location of the locating piston or other element, with the core located in the final molding position. In the system with a rod locking system such as disclosed in the above referenced application, the locking housing is provided with an opening to receive the threaded nose connection of the switch and is preferably stepped with an innermost stop wall to accurately set the depth of the switch. The threading of the switch unit within the housing and with the body within the stepped portion minimizes the outer projection of the switch unit and insures minimum projection with respect to the mechanism and interference with the other components of the molding apparatus as such. The switch is preferably a single pole, double throw switch with a movable contact movable between two fixed contacts. The movable contact is connected to high strength magnet, which may be referred to as a target magnet. The high strength magnet is sized to be attracted by the metal piston or other moving part of an appropriate material of the core positioning mechanism in a system. The target magnet is biased by a suitable unit, and preferably an oppositely polarized, but weak magnet (which may be called a bias magnet), into spaced relation to the actuating member of the core positioning mechanism. The target magnet is mounted closely spaced from the outer face of the switch and thereby slightly spaced from the moving actuating member, which upon alignment with the target magnet overcomes the weak magnet and moves the switch. The switch includes a moving contact, and is preferably connected with a normally open contact construction for connecting to the almost universal method of core sensing and signaling the proper core position. The switch may be connected with a normally closed contact construction for any unusual design. This simple switching arrangement is found desirable as establishing the ability of the system to handle a wide range of currents and voltages, and adapts the switch for almost every wiring style available and encountered in the trade. The switch, in particular, readily covers all the common voltage sources used in national and international industrial controls of mold and die casting systems. The switch preferably has maximum contact ranges of 1 amp at 240 volts AC, 2 amps at 120 volts AC and 1 amp at 24 volts DC. Such a range will cover all common voltage sources used in national and international industrial controls and molds, and particularly conventional signal requirements such as relay interfaces and/or PLC (programmed logic control) interfaces. This versatility is particularly desirable in many sensors because they are most often wired into a control or PLC interface. A control has typical currents in the range of 0–500 milliamps at 0–24 volts DC or 0–500 milliamps at 0–240 volts AC. With common control interfaces, the normal ranges encountered are 12 or 24 volts DC and 8 volt DC NAMUR circuits.

The switch is preferably a single pole, double throw switch having three external contacts or terminals. The switch thus will allow wiring to the control of all conventional and nearly all non-conventional systems in the mold and die casting industry. No practical exception is currently known or envisioned. A simple single pole, single throw switch would work for most applications, while a single pole, double throw switch provides enhanced flexibility, and a double pole, double throw switch may be provided for certain applications.

The structure with the internal relay styled contact eliminate the need to power the sensor or provide restrictive power to the contacts. It further completely eliminates the need for a separate box to power the sensor and convert the sensor signals to relay outputs. The total relay is thus embedded within the sensor and being a simple contact unit eliminates problems associated with power capability, for example, as between Europe and the United States. The universality of the switch structure makes it applicable for all normal mold apparatus applications while minimizing the total cost.

The switch unit in a preferred construction is attached with an O-ring seal disposed between a ledge in the recessed or stepped opening of the actuator and a shoulder of the switch body. The sensor is seated in place with the O-ring seal firmly compressed between the ledge and shoulder to seal the connection and locate the sensor within a minimum sensing range. The sensor can therefore be set to a single depth and prevented from being turned in too far and being damaged or spaced excessively from the sensing member which could create potential malfunctions. An O-ring seal is also superior to the other conventional sealing methods using a seal which crushes material between the base of the threaded end and/or sealing on a smooth bore of the sensor.

By the use of an appropriate high strength magnet, the system will be less sensitive to precise distances but will readily respond to those which have a relatively repeatable set position with the threaded and O-ring seal connection. The threaded connection and O-ring seal has been found to produce a simple direct positioning and setting of the sensing switch to the housing for responding to the location of the actuator member by turning and threading the switch firmly into place.

The present invention has thus been found to provide a switch which fits within the substantial majority of mold or die casting apparatus at a significant cost decrease in the switch system while responding to the positioning of the actuator, and thereby the positioning of the mold core in a high-loaded pressure molding assembly.

In a preferred construction, the internal magnet was attached directly to a movable contact switch and when the magnet responds and is attracted to the piston or element connected to the piston it will rapidly move from the one position to the other providing a precise open/closed contact control.

The present invention thus provides a more or less conventional single pole, double throw relay switch structure having a minimal length while establishing reliable operation as a result of the use of an appropriate magnet arrangement for moving of the movable contact and provides a highly reliable and less expensive solution to prior switching systems.

DETAILED DESCRIPTION OF THE INVENTION

Figure 1:
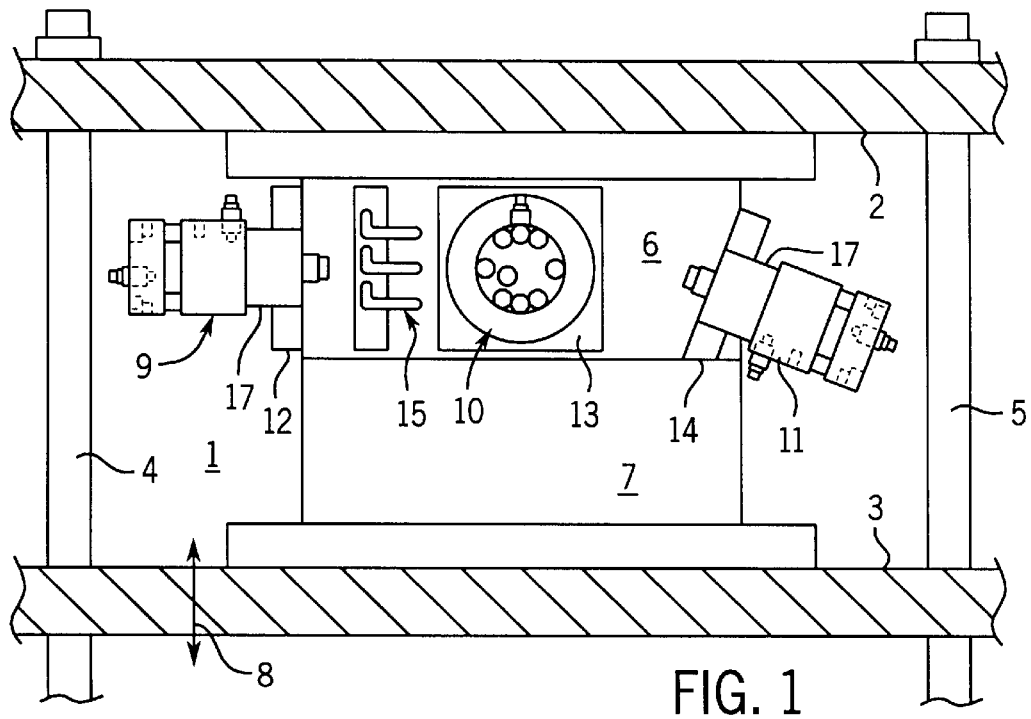
FIG. 1 is a simplified illustration of a mold casting structure incorporating an embodiment of the present invention.

Referring particularly to FIG. 1 a simplified illustration of a molding apparatus 1 is illustrated incorporating the structure of the present invention. The molding apparatus 1 is firmly secured between a stationary press platen 2 and a movable press platen 3 which are secured to each other by suitable side tie bars 4 and 5. The illustrated molding apparatus 1 includes a cavity half 6 and a core half 7 secure in stacked abutting relation. The cavity half 6 and the core half 7 form the internal mold cavity and the associated structure for receiving the casting material, open the mold for removal of cast product in accordance with well-known constructions. The cavity half 6 and core half 7 are located between press platen 2 and the press platen 3. The platen 3 is movable, as shown by arrow 8, for closing and opening the molding apparatus. The cavity half and core half may include any number of core members each of which is connected to a slide actuator 9, 10 and 11, respectively. The core members, not shown, are connected the related actuator, in any known or other construction. In the illustrated embodiment of the invention, the one actuator 9 is shown located to the left side of the cavity half 6 and projects to the left in the illustration. The second actuator 10 is mounted centrally and projects outwardly therefrom. To the opposite or right side, the actuator 11 is shown secured to the cavity half 6 at a slight angle to project into the assembly and secure the cavity core in appropriate orientation in the assembly. The actuators are secured to the cavity half 6 by suitable mounting brackets 12, 13 and 14, respectively, and project outwardly therefrom. The cavity half 6 of the core assembly includes a plurality of water lines 15 for cooling of the assembly, along with various other mold accessory items, not shown.

Figure 2:
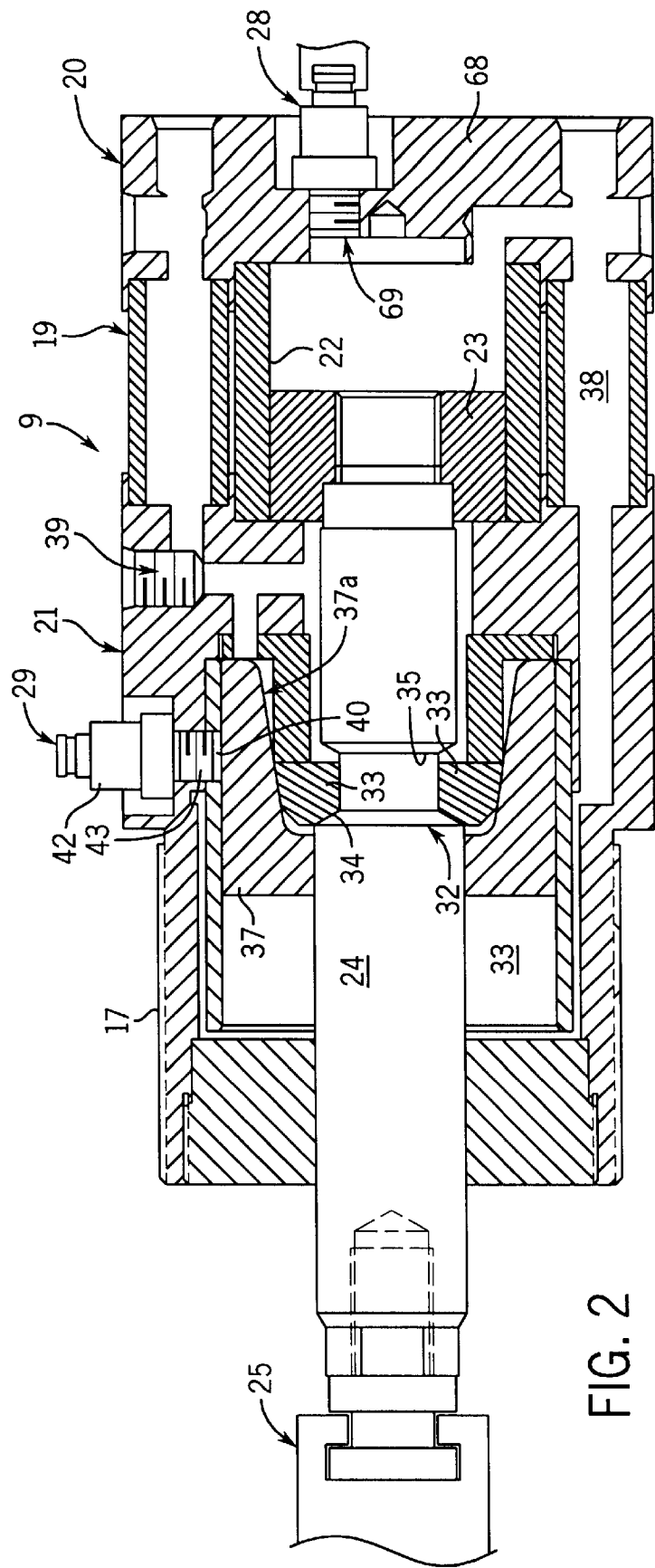
FIG. 2 is an enlarged view of an actuator incorporating the position sensing unit.

Referring particularly to FIG. 2, the external hydraulic actuator 9 is shown constructed as in the above referenced application, and includes a multiple part outer housing 19, an outer head 20 and a base 21. The housing 19 includes an inner cylinder 22 secured between head 20 and base 21, with a piston 23 slidably mounted therein. A piston rod 24 extends through the base 21 and is connected to locate a core 25 within the cavity half 6, and with the several other cores and actuators 10 and 11 define the mold cavity. The position of the piston rod 24 is critical to proper positioning of the core slide and the attached core. To efficiently operate the assembly and provide for maximum speed and efficiency of molding upon the closing of the assembly, the actuators 9, 10 and 11 are operated simultaneously or in appropriate sequence to rapidly form the cavity for receiving of the casting or molding material. Upon completion of the molding cycle, the cores are rapidly retracted permitting access and removal of the molded product. Upon removal of the product the cavity is again closed and the cycle continued. Accurate positioning of the cores to the mold position, as well as to the retracted position for complete removal of the product, is of substantial significance in the molding of different forms and devices.

Historically, the location of the piston, and thereby the attached core, is detected and monitored to provide a signal to the control system with the two extreme positions of the core.

Referring to the actuator 9 shown in FIGS. 1 and 2, a retract sensor unit 28 is secured to the outer end of the actuator head 20 and projects longitudinally outwardly therefrom. The inner location of the piston 23 and thereby the core is located by a second sensor 29 secured to the side of the actuator and particularly the base 21 and senses the positioning of the piston rod 24 and corresponding core slide and in the closed and loaded position, as presently described.

Figure 3:
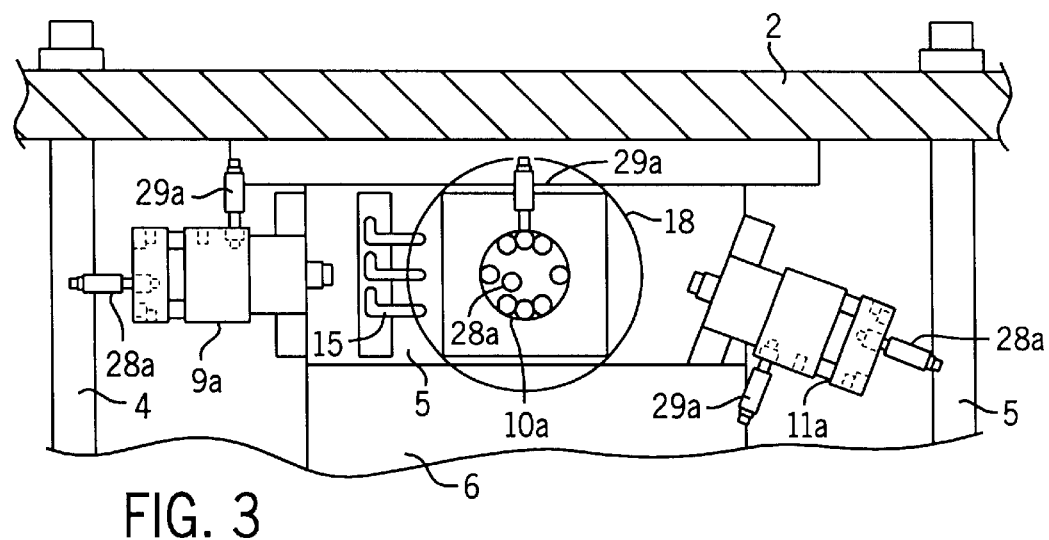
FIG. 3 is a fragmentary view similar to FIG. 1 illustrating the prior art.

As shown in FIG. 1, the sensors 28 and 29, associated with all actuators 9, 10 and 11, are all spaced from the surrounding portions and members of the mold support apparatus. Each sensor projects only shortly from the respective housing of the actuator. These are typical of the new invention as well as the costly electronic interface sensor previously discussed in the background of the invention. In all prior art relay switch sensors, however, the switch has extended outwardly substantially from that of the illustrated embodiment of the invention on the order of three inches and moved into interfering engagement with the surrounding structure. A typical example of the prior art is shown in FIG. 3, which is a fragmentary portion of the mold apparatus as shown in FIG. 1. The prior art relay sensor 28a, and 29a as shown in FIG. 3, interfere with various associated components of the equipment such as the tie bars, 4 and 5, a plate portion of the cavity half 6, the core half 7 and the like. The actuators 9, 10 and 11 are all constructed with a threaded portion 17 on the end of the base 21. The actuators are threaded into the mounting brackets 12, 13 and 14 for accurate positioning of the actuators. The rotational path of the actuator 10 is shown by the circle line 18 in FIG. 3. With a conventional long relay switch, interference is often encountered with the water lines 15 and other accessories, not shown. The computer sensor unit using Hall effect cells and appropriate interfacing provided a system basically as shown in FIG. 1, with a cost factor generally similar to the system of FIG. 3, as heretofore discussed.

The present invention is directed to a small compact and rugged relay switch as the sensor units 28 and 29, with a maximum length of two inches, which provide a significant clearance with respect to associated known equipment and mold and die casting apparatus including the cooling lines 15, as shown in FIG. 1. Further, as shown in the illustrated embodiment and more fully described hereinafter, the compact relay switch units 28 and 29 of the present invention also establish a compact, solid and rigid body structure. The units are therefore more robust and significantly reduce the probability of damage as a result of assembly and other handling, particularly when compared to long prior art relay switch structures of FIG. 3.

Figure 4:
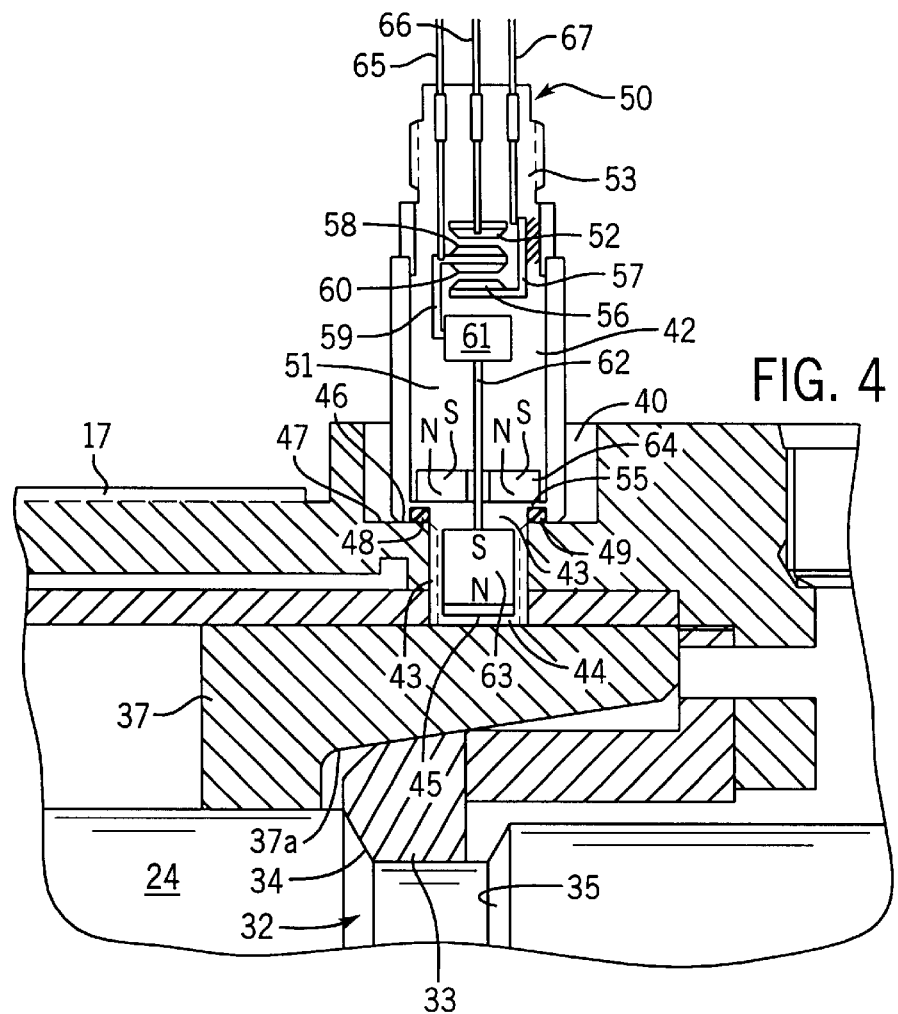
FIG. 4 is a fragmentary enlarged view illustrating the mounting and positioning of a sensing unit.

Referring to the drawings and particularly to FIGS. 2 and 4, the hydraulic actuator 9 is shown as more fully disclosed in the above entitled application, with the mounting of the sensor units of this invention. More particularly, the actuator unit 9 includes the hydraulic cylinder system with the piston rod 24 projecting outwardly through the base 21 into connection with the core 25. A locking unit 32 is located within the base 21 to lock the extended cylinder rod 24 in place with the core in the proper and in an extreme loaded position. The locking unit 32 includes locking segments 33 surrounding the rod 24 within a locking chamber and cylinder 33 in the base 21. Each segment 33 includes a tapered projection 34 aligned with a groove 35 in the piston rod 24. An internal piston member 37 is slidably mounted on the piston rod 24 in spaced relation to the segments and projects over the segments 32. Member 37 has a tapered inner wall 37a opening rearwardly the piston. Hydraulic passageways 38 and 39 within the outer wall of the housing connect to the opposite ends of the locking cylinder 33 and to a hydraulic source, not shown. When the power piston 23 reaches the terminal end, locking fluid pressure is applied to the piston member 37 via the passageway 38. The piston member 37 moves into clamping engagement with the locking segments 32, forcibly holding the projections 34 in the recess 35 in the piston rod 24, forcing the piston rod forwardly to increase the loading of the core and positively locks the rod 24 and attached core in a final core position with the core held in place under an extreme load. As the piston member 37 moves to the locking position, it moves past a small side wall stepped opening 40 which extends through the base wall and outwardly, with the sensor unit 29 secured therein. The sensor unit 29 is mounted within the opening 40 to detect the locking position. When the core is to be released, fluid is applied to a release passageway 39 in the base. The locking piston member 37 retracts and releases the piston rod and the piston is returned to the home position. The above structure of the core locking system is more fully described in the cross-referenced pending application.

The sensor 28 in the head is similarly mounted in the outer end of the housing head and detects the fully retracted position.

Referring particularly to FIGS. 2 and 4, the sensor unit 29 has an outer housing 42 with an inner threaded nose 43 which is threaded into the stepped opening 40 in the side wall of the actuator base 21. The switch may have an inner end wall 44 with the outer face spaced slightly from the path and position of the locking piston 37 as at 45.

The sensor unit 29 includes the outer housing 42 with the threaded nose 43 of a slightly reduced diameter to form a shoulder 46. The housing opening 40, is a stepped opening and defines an outer encircling abutment wall or ledge 47 aligned with the shoulder 46 of the sensor housing 42. The shoulder 46 has an O-ring seal recess 48. An O-ring seal 49 is placed within recess and projects therefrom. Upon tightening the unit 29 in place, the O-ring seal 48 is compressed between the shoulder 46 and the base ledge 47 of the enlarged stepped wall opening 40. The switch unit 29 is threaded into firm engagement, compressing of the O-ring seal and establishing a firm final position of the switch unit, as shown in FIG. 4. In the latter position, the inner face or wall 44 of the switch unit 29 is in close spaced relation to the position of the locking piston 37 in the locked position. The inventor has found the above structure provides a reliable and rugged relay switch unit which is located to respond to the piston positions.

The switch housing 42 is a strong body which projects outwardly and terminates at the outer end in a conventional three line or pin connector 50, or other similar connector conventionally and readily known connection for interconnection of a relay contact switch unit directly to a single on/off control circuit without the necessity of a costly interface.

As previously discussed, the switch unit is preferably a single pole, double throw switch having a pair of fixed contacts and a movable contact located therebetween. Referring particularly to FIG. 4, the outer housing 42 has an inner contact chamber 51 with an outer end wall 53 at the connection portion 50 and a stepped inner end wall 55 adjacent the stepped nose portion of the switch housing 42. A normally closed fixed contact 52 is secured within the housing to the outer wall 53 in insulated relationship. A second normally open contact 56 is mounted by a supporting and conductive arm 57 to the outer end wall 53 and projects inwardly, with the second contact 56 located in aligned spaced relation to the normally closed contact 52. A movable contact 58 is located between the two fixed contacts 52 and 56. The movable contact 58 is attached to an L-shaped support member 59 and particularly to an inner horizontal cross leg 60 located between the fixed contacts 52 and 56. Movable contact 58 has contact buttons on the opposite faces on the conductive cross leg 60 for selective engagement with the outer fixed contact 52 and the inner fixed contact 56, respectively. The movable support member 59 is connected to supporting body 61 located to the opposite side of the second or inner fixed contact. A supporting and interconnecting rod 62 projects through the housing 42 and nose 43 to a relatively high powered or target magnet 63 of a magnetic unit is slidably mounted within the threaded nose 43 of the switch housing. The magnet 63 is polarized axially and is shown with a north pole (N) adjacent the end of the switch nose and south pole (S) spaced inwardly to the opposite end of the strong magnet. A weak control magnet 64 of the magnetic unit is mounted within the housing at the housing shoulder 47, with the connecting rod 62 passing through a central opening therein. The magnet 64 has its north pole (N) adjacent the south pole (S) of the strong magnet 63. The magnet 64 attracts the strong target magnet 63, thereby moving and holding the strong magnet axially spaced from the nose end wall 44, and through the rod interconnection to the movable contact 58, moving the common movable contact 58 outwardly, with the upper contact button thereof held in engagement with the outer fixed contact 52, thus establishing the outer fixed contact 52 as the normally closed contact. The inner fixed contact 56 is thus defined as the normally open contact in the illustrated embodiment. The relay switch contacts are constructed in a preferred unit with zero leakage current when opening and voltage drop when closed. The magnet is spaced in a practical application with the range 0.020 to 0.070 inches from the actuator piston 37, and preferably about 0.035. Depending upon the particular strength of the strong magnet a greater range, such as 0.010 to 0.100, may be used.

When the steel locking piston 37 moves past the sensing opening 40, the strong target magnet 63 is attracted to and moves to the end of its housing, readily overcoming the force of the weak magnet. The magnetic poles or flux which passes through the magnet and adjacent structure is thus sufficiently strong to overcome the force of the weak control magnet 64, and positively moves the strong target magnet 63 toward the locking piston 37 and simultaneously carrying the interconnected movable contact 58, which then moves the necessary distance to positively engage the second or normally open contact 56 and complete the signal to the control, not shown. The steel pistons 37 provide a practical movable member for actuating the system. The movable member may be any other element in a system and may include a special material or special portion which properly interact with magnet 63 actuating of the magnetic unit.

With modem high grade magnets, the relatively small magnets will provide the necessary forces to establish firm electrical engagement to the normally open contact as well as to the normally closed contact. Thus, the weak force is sufficient to maintain the normally closed contact while otherwise permitting the reliable movement of the switch from the standby to the actuated state. The switching time is readily established to substantially 15 milliseconds maximum, although other switching times may be created depending upon the particulars of the magnets and the switch structure.

The switch connector 50 is connected by a conventional three line cable providing a connection to each of the contact leads 65, 66 and 67, connected respectively to the three contacts connection in the outer end or head of the switch unit. The leads 65, 66 and 67 are connected to the control system for operating the connection of the hydraulic supply to the actuator for moving of the piston 23 and the related movement of the core locking system 32.

Figure 5:
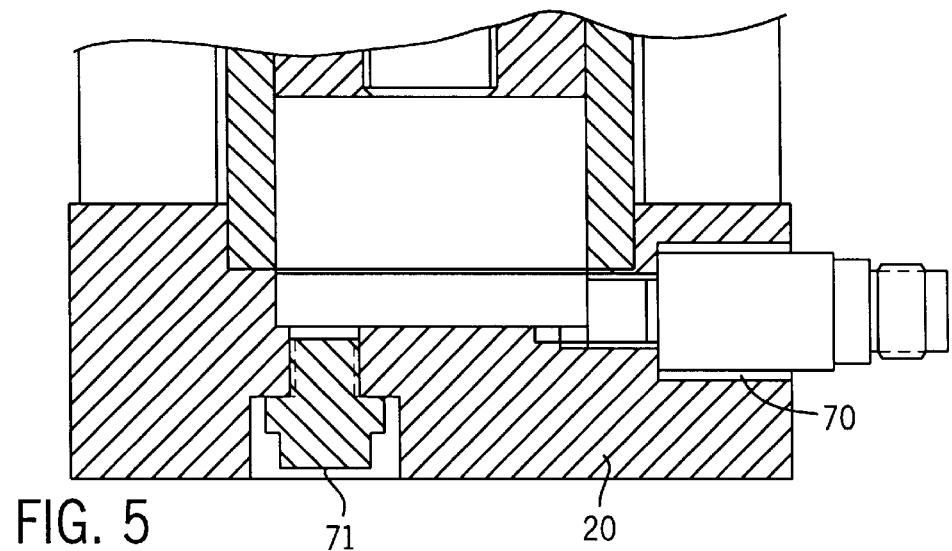
FIG. 5 is a fragmentary view of the actuator with an alternative location of a retract sensor.

Switch unit 28 is similarly mounted in the head 20 within an opening 68, with a somewhat larger air gap 69 (FIG. 2) as a result of the head construction, as shown in FIG. 2. The unit 28 responds to the piston 23 to similarly operate in response to full retraction of the actuator. As also shown in FIG. 5, the head 20 is preferably constructed with a side mount stepped opening 70 for selective placement of sensor 28 in either the position of FIG. 2 or the alternate position of FIG. 5. The opening 68 or 70, not used, is sealed with a plug 71. This permits further tailoring of the arrangement to the particular mold apparatus.

Each switch unit 28 and 29 is a simple compact and rugged relay switch unit for direct connection to the control system without the necessity of any costly interface. The total switch unit has length of no more than two inches between the outer face of the connector 50 and the inner nose wall 44. The shortest length is desired. As previously discussed, switches may be directly connected as a normally open switch or as a normally closed switch to cover all possible available systems. The switch is thus adapted for practically all conventional common voltage sources used in national and international industrial molding controls and loads, as well as any particular signal requirements such as relay interfaces and/or PLC interfaces.

Although any magnetically actuated switching unit might be employed in this application, a magnetic bias switch provides a preferred structure. Thus in the absence of the target the switch is magnetically biased to an open position. Upon alignment with the target the magnetic field retracts the switch to the working position. The present invention is thus broadly directed to a compact rugged relay switch having a reliable switching system incorporating a strong magnet and the proper biasing system. One or more additional magnets arranged and coupled to the weak magnet and/or the strong magnet to control the response of the strong magnet to the core related member can be provided. Additionally, a mechanical bias system such as a spring or other device could be provided to replace the bias magnet arrangement. The reliability and life of the system must be considered.

I claim:

1. In combination, a mold or die casting apparatus comprising an outer mold having a movable core for opening and closing the mold cavity, said core being movably mounted within the mold and configured to be positioned between an open mold position and a closed mold position, a core positioning unit connected to said core for moving said core between said positions, said positioning unit having an outer housing with a movable member moving through the housing and having a locking unit for locking of the movable member in position with the movable member in the closing position of said mold, a compact sensing relay switch unit secured to a mounting surface of said housing and having a switch body projecting outwardly from said mounting surface and having an inner sensing end located to respond to the movement of said movable member, said relay switch unit having at least one set of first and second contacts movable between an engaged position and a spaced position, said contacts including output connections, and a magnetic means movably mounted within said switch body and connected to one of said first and second contacts and normally holding of said contacts in a first relationship wherein said contacts are in engagement or are in said spaced relation, said switch body locating said magnetic means in the close spaced relation to the path of said movable member, said movable member being constructed to move said magnetic means in response to preselected alignment of said movable member and said magnetic means and operable to move said magnetic means to reverse the position of said first and second contacts, said switch body having a maximum length on the order of two inches.

2. The combination of claim 1 wherein said magnetic means includes a strong magnet in the outer end of the body in said housing, an opposing weak magnet fixed within the body in inwardly spaced relation to said strong magnet and having an opposite polarization and magnetic field which is weaker than the field of said strong magnet, said weak magnet attracting and holding said strong magnet in a retracted position spaced outwardly from the movable member within said body in the absence of said movable member and thereby holding the contacts in the first position, and the strength of said strong magnet being in response with the alignment with said movable member to move from said weak magnet and into engagement with said movable member for holding the contacts in said second position.

3. The combination of claim 2 wherein said strong magnet is held by said weak magnet in a normal position spaced from the path of the movable member in the range of 0.010 to 0.100 inches.

4. The apparatus of claim 3 wherein said strong magnet is spaced from the movable member in the range of 0.020 to 0.070 inches.

5. The apparatus of claim 4 wherein said switch strong magnet is spaced 0.035 inches.

6. The apparatus of claim 2 wherein said contacts of said relay switch unit are rated at 2 amperes at 120 volts AC, 1 ampere at 240 volts AC and 1 ampere at 24 volts DC.

7. The apparatus of claim 6 wherein said switch responds with said metal surface within 0.020 to 0.070 inches of the end of said strong magnet.

8. The apparatus of claim 6 wherein said switch and strong magnet create a switching time of 15 milliseconds maximum.

9. The apparatus of claim 2 wherein said magnet means is a permanent magnet polarized in a direction perpendicular to the surface of said movable member, a support for said magnet includes a connection between said magnet and the movable contact, said weak magnet is secured in fixed relation within said body with the attracting force biasing said strong magnet into the body.

10. The apparatus of claim 9 wherein said switch unit includes a third contact located in alignment with said movable contact into the opposite side from said other contact, said third contact having an output connection whereby said switch unit defines a set of normally open contacts and a set of normally closed contacts.

11. The combination of claim 1 wherein said switch body includes a threaded projecting nose with an encircling shoulder, said housing having a threaded opening to receive said nose with a ledge at the outer end of said opening, an O-ring seal located between said shoulder and said ledge, said switch housing threaded into said opening to locate and fixedly support the housing in fixed relation to said housing with the O-ring seal compressed between said ledge and said shoulder and with the end of the nose located to position said magnetic means to sense said movable member.

12. The apparatus of claim 9 wherein said nose is closed by a thin end wall.

13. A core positioning apparatus for slidably mounting and moving a core between a closed position and an open position within a mold unit or die casting unit, comprising an actuator including a hydraulically movable piston connected to said core by a piston rod, said actuator including a locking unit configured to engage said piston rod and lock said piston rod and core in preselected positions under high pressure to hold said core in said closed position, said locking unit having an outer housing with said piston rod passing therethrough, a relay switch unit including an outer body having a threaded nose and having a total length no greater than two inches including said nose, said outer housing having a threaded opening matching the threaded nose of said switch unit, said switch having said threaded nose threaded into said opening and locating the inner end of said nose in a close spaced relation to the outer end of said switch opening, said relay switch unit having a magnetic sensing unit responding to the position of said locking unit and having a contact assembly including opposed contacts with at least one movable contact which moves in response to the movement of said locking unit into the locked position, said movable contact connected to said magnetic sensing unit for positioning of said movable contact and said switch between a closed position and an open position.

14. The positioning apparatus of claim 13 wherein said housing and body have opposed abutting walls at said threaded opening, an O-ring seal located between said abutting walls, said threaded connection firmly compressing said O-ring seal and establishing the proper location of said inner end of said nose.

15. The positioning apparatus of claim 13 wherein said contacts in said closed position have a zero voltage drop and said contacts in said open position have a zero leakage current.

16. A core positioning apparatus for slidably mounting and moving a core between a closed position and an open position within a mold or die casting unit, an actuator including a powered member connected to said core for moving of said core between preselected positions including a core open position and a closed position, said actuation holding said core in said closed position under an intense load, a fixed outer housing with said powered member moving therethrough, a relay switch unit including an outer body having a threaded nose and having a total length no greater than two inches including said nose, said outer housing having a threaded opening matching the threaded nose of said switch unit, said powered member aligned with said opening in said closed position, said switch having said threaded nose threaded firmly into said opening and locating the inner end of said nose in a close spaced relation to the outer end of said switch opening, said relay switch unit having a magnetic sensing unit responding to the position of said locking unit and having a contact assembly including switch contacts with at least one movable contact which moves in response to the alignment of the powered member with said switch opening, said contact assembly having at least one second contact located in the path of said movable contact, said movable contact connected to said magnetic sensing unit for positioning of said movable contact and said switch between a closed position and an open position.

* * * * *